US012527436B2

(12) United States Patent
Dziadon et al.

(10) Patent No.: US 12,527,436 B2
(45) Date of Patent: Jan. 20, 2026

(54) PLANT-BASED MILK MAKER AND BLENDER, ESPECIALLY FOR HOME USE

(71) Applicant: Anna Dziadon, Podgorska Wola (PL)

(72) Inventors: Anna Dziadon, Podgorska Wola (PL); Jaroslaw Perczak, Czestochowa (PL)

(73) Assignee: Anna Dziadon, Podgorska Wola (PL)

( * ) Notice: Subject to any disclaimer, the term of this patent is extended or adjusted under 35 U.S.C. 154(b) by 665 days.

(21) Appl. No.: 17/640,629

(22) PCT Filed: May 20, 2019

(86) PCT No.: PCT/PL2019/000041
§ 371 (c)(1),
(2) Date: Mar. 4, 2022

(87) PCT Pub. No.: WO2020/222661
PCT Pub. Date: Nov. 5, 2020

(65) Prior Publication Data
US 2023/0000286 A1    Jan. 5, 2023

(30) Foreign Application Priority Data

Apr. 29, 2019 (PL) .......................................... 429789

(51) Int. Cl.
*A47J 43/046* (2006.01)
*A47J 19/02* (2006.01)
*A47J 43/07* (2006.01)

(52) U.S. Cl.
CPC ........... *A47J 43/046* (2013.01); *A47J 19/027* (2013.01); *A47J 43/0716* (2013.01); *A47J 43/0727* (2013.01)

(58) Field of Classification Search
CPC .. A47J 43/046; A47J 43/0716; A47J 43/0727; A47J 43/085; A47J 19/027
(Continued)

(56) References Cited

U.S. PATENT DOCUMENTS 9,474,403 B2 * 10/2016 Chen ...................... A47J 19/027
10,272,448 B1 * 4/2019 Arnold, III ............... A23L 2/72

FOREIGN PATENT DOCUMENTS

EP      2441358 A1   4/2012
EP      3323329 A1   5/2018
(Continued)

*Primary Examiner* — Christopher L Templeton
*Assistant Examiner* — Teresa A Guthrie
(74) *Attorney, Agent, or Firm* — Dickinson Wright PLLC; Andrew D. Dorisio; Nicholas P. Coleman

(57) ABSTRACT

A plant-based milk maker and blender for the production of the plant-based milk includes two or three interconnected segments. In one version, the bottom segment is a base with the drive engine and the upper segment is a pitcher container with a rotatable lid. The base has a cylindrical coupling element in the upper part with incisions corresponding to incisions in a rotating blending part of the pitcher container. The pitcher container is equipped with the blending element coupled with a drive shaft operable at two different rotational speeds. In another version, the base is provided with one or more switch buttons, and a central segment contains a cylindrical chamber with a drain opening and a draining funnel on its circumference and in a cylindrical chamber there is a rotatable perforated drum and the drive shaft of drive engine of the base passes through the central segment of the drum.

2 Claims, 10 Drawing Sheets

(58) Field of Classification Search
USPC .................................................. 241/46.01
See application file for complete search history.

(56) References Cited

FOREIGN PATENT DOCUMENTS

| WO | 2010019242 A1 | 2/2010 | |
|----|----|----|----|
| WO | 2012080244 A1 | 6/2012 | |
| WO | WO-2020002046 A1 * | 1/2020 | ............ A47J 19/027 |
| WO | WO-2020002118 A1 * | 1/2020 | ............... A23N 1/02 |
| WO | WO-2020002167 A1 * | 1/2020 | ............ A47J 19/027 |

* cited by examiner

PLANT-BASED MILK MAKER AND BLENDER, ESPECIALLY FOR HOME USE

TECHNICAL FIELD

The subject of the invention is the plant-based milk maker and blender, especially for home use but also for cafes and other gastronomic outlets.

BACKGROUND

The kitchen household appliances usually have one specific function. While a kitchen blender is dedicated to blending smoothies and a juice extractor or juice maker to make fresh juices, they don't serve a second purpose.

Household appliances have one specific function; if the device is designed to blend smoothies or extract juices it is not suitable for any other purpose. Kitchen mixers have their structure in the form of standing base with a drive motor or a hand hold base with a motor to which various tips are connected, such as blender blades or mixing tips or whipping foam tips. In the case of a juicer as well as a juice extractor, the device performs one function and is unsuitable for another purpose.

Nowadays due to the growing concern for health and healthy nutrition and the spread of various types of civilization diseases, such as sensitivity to gluten or cardiovascular diseases and obesity, other sources of nutritional values are in demand. One of them is almond milk, which replaces cow's milk for many as well as other types of plant-based milks.

Almond milk is the most bought of all available plant-based milks. Its popularity began to increase since year 2000, when soybean, the main source of plant substitutes of dairy products and meat, became unfavored and information about its possible negative impact on health began to be comprehended by the public.

Almond milk is not a discovery of the modern world though. It was already known in the late Middle Ages and used instead of cow's milk during periods of fasting, when it was prohibited not only to eat meat, but also eggs and dairy products because of the presence of animal fat. It was a popular ingredient of the richest, as evidenced by the fact that in the fourteenth century cookbook there were as many as one fourth of recipes with almond milk. It was also valued because it was much slower to spoil than cow's milk. Almond milk was also formerly used to make butter. It is worth noting that almond milk can be fermented using special strains of yogurt bacteria or kefir mushrooms, therefore it is suitable for the production of vegan yogurt, kefir and other fermented products.

Almond milk is in fact not a typical milk, but a plant-based milk obtained from grinding almonds while mixing them with water. Due to the fact that it has been used as a substitute for cow's milk in recipes or added to coffee, the name "almond milk" was adopted. This plant-based milk is 100% vegetable based. It has a whitish color and a slightly sweet silky taste with the nutty notes. It is used by vegans, vegetarians, people on a diet without dairy products and those who suffer from lactose intolerance.

SUMMARY

Importantly, almond milk contains very little phosphorus (10 mg/100 g), thanks to which calcium is absorbed by the organism without any issue. The imbalance in the consumption of calcium and phosphorus causes calcium leaching out of the bones to even out the concentration of these elements in the blood. In almond milk phytic acid is present, which hinders the absorption of some minerals, mainly zinc, magnesium and iron.

Almond milk is the most popular among vegetarians and people with lactose intolerance. It has a specific slightly nutty and delicate flavor, thanks to which it works well as a base for oatmeal, smoothies, an addition to sweet pastries or aromatic coffee. The richness of nutrients flowing from almond milk should however also be appreciated by others, including people with cardiovascular system diseases, diabetics and the ones caring for a slim figure.

Almond milk is made from ground almonds, an intermediate product obtained from more nutritious nut species— the almonds. Consumption of almond milk provides the body with numerous minerals, vitamins and unsaturated fatty acids. Almond milk is characterized by a high content of vitamin E, which is considered a vitamin of youth, because it is a powerful antioxidant. Alpha-tocopherol (vitamin E) has antioxidant properties and supports the immune system. The richness of unsaturated fatty acids causes almond milk to lower the level of total cholesterol and LDL fraction in favor of the growth of beneficial HDL levels. For this reason, it is recommended for people struggling with cardiovascular diseases such as: atherosclerosis, coronary heart disease. In addition, natural almond milk contains a little sugar and calories, which allows us to state that this product should be included in the diet of diabetics and people who care about their slim figure.

Vegetable protein contained in almond milk is easier to digest compared to cow's milk protein—casein, that is why this product is recommended for people struggling with diseases of the digestive system like heartburn, ulcers, reflux. Almond milk is very low in calories. 100 ml of milk provides 24 kcal, and in one glass about 60 kcal. It contains little protein (0.5 g/100 g), fat (1.1 g/100 g) which is less than regular 1.5% milk, and very few carbohydrates, only 1.4 g of digestible sugars and 1.6 g of fiber. Almond milk does not contain lactose, which is milk sugar. It is a source of vitamins D, E, as well as B2 and B12. Fortified almond milk contains additional amount of calcium.

Comparison of the nutritional value of a glass (250 ml) of almond milk with a glass of 2% of cow's milk:

| Unsweetened almond milk | 2% cow's milk |
| --- | --- |
| 60 kcal | 122 kcal |
| 2.7 g fat | 5 g fat |
| 1 g protein | 8 g protein |
| 1.4 g natural sugars | 12 g natural sugars |
| 200 mg calcium | 250 mg calcium |

Almond milk is now readily available in stores. Almond milk is produced in several flavors: unsweetened, sweetened, vanilla and chocolate.

Many producers strive for a consistency and taste similar to cow's milk, and long shelf life hence almond milk is not stored in the fridge and due to that is very difficult to find one that is fresh and with a pure composition, without unnecessary additives. In the beverages available in stores, the content of actual almonds varies from 2 to 8% maximum nowadays.

Substances added to almond milk are primarily sugar. Rarely it is ordinary white beet sugar, but it is completely irrelevant whether the organism will receive sucrose from beet sugar, cane sugar, or agave syrup. The metabolic and health effect is just as negative. Almond drinks are sweetened with cane sugar, agave syrup or corn syrup, usually with the indication of organic crop origin.

Another group of additives added to almond milks found on shelves are thickeners: tapioca starch, rice starch and maize maltodextrin. These substances are digested like sugar. Another type of thickeners and stabilizers in almond milk are polysaccharides belonging to the water-soluble fraction of fiber. These include locust bean gum, gellan gum and controversial carrageenan. They are not harmful to health, but from the point of view of the consumer, their addition is unnecessary. As far as carrageenan is concern, the latest review studies of 2018 do not confirm its harmfulness. Usually in almond milk there are natural aromas, sometimes salt, and in the worst composition drinks—sunflower lecithin acting as an emulsifier. Some producers enrich their products with calcium and fat-soluble vitamins (A, E, D) and vitamin B12. There is no almond milk on the market without additives. Almond milk should contain almonds and water. Permissible is addition of aroma and thickener. It is true that they are not needed, but you cannot buy an almond milk in the store without these additives. It is wise to avoid sweetened beverages with a low content of almonds and containing more than 4-5 additives. The addition of phosphates is also undesirable. The producer informs that this is an enriching ingredient, but our diet is so rich in phosphorus that it is better to limit it than to enrich it with products in which it is naturally absent.

Almond milk can be utilized exactly like cow's milk such as:
added to coffee or tea
for breakfast cereals
to make smoothies based on it
use in a pancake dough
use for baking instead of cow's milk
to cook porridge, cereals and puddings
to use for sauces and marinades
to make homemade yogurt
for drinking Almond milk is resistant to high temperatures. You can cook it and use in baking.

The most valuable is therefore an almond milk made immediately before consumption and without any additives.

Almond milk can be made at home by soaking almonds in water for a few hours. Milk from sprouted almonds, where the enzymes and inhibitors are released by soaking almonds in the water overnight is the richest in valuable nutrients and the easiest digestible for a body. Then soaked almonds are transferred to the blender and water is added in a ratio of 3:1. After blending, it is necessary to pour the prepared mixture onto a sieve lined with gauze, strain and manually squeeze. Such a process is long-lasting, inefficient, and not completely hygienic. In the case of producing fresh almond milk in a coffee shop as an additive, e.g. for coffee, this procedure is unacceptable for sanitary reasons.

There is also a known method of producing almond milk in a juice extractor. Almonds are soaked in water for several hours and then fed into the juice extractor with water. This method also leads to obtaining almond milk, however, the juice extractor's milk contains particulate matter, since the juice extractor construction is to ensure their presence in the extruded juice. With the juice extractor, a liquid product is obtained which is the result of pressing the material with a high force through a stationary perforated roll. The force of the pressure is so high that it can get a lot of fruit or almonds particles into the juice or almond milk. Among other things, this is one of the differences between the juice extractor and the juicer. If almond milk is to be obtained as a coffee additive, it should have the form of a clean liquid without the suspended solid particles. Also, when almond milk is used to feed babies with a teat, a large number of solid particles will clog the teat.

Similarly, one could obtain plant-based milk from other nutritious raw plant grains and seeds such as pumpkin seeds. Pumpkin seeds have numerous nutritional values, of which the zinc content is meaningful as they are one of the richest sources of this element. Thanks to zinc, pumpkin seeds have healing properties that improve e.g. sexual performance, fertility and can help with prostate hypertrophy. Pumpkin seed milk obtained in an extruder contains a considerable amount of smear substances and has an unpleasant consistency.

Known juice extractor described above creates a product that consists of water and crushed, squeezed under high-pressure pulp of the grain or nut, and in this case, these are almonds or other seeds such as pumpkin seeds or buckwheat. The end product obtained with the use of juice extractor is not similar to milk akin to the almond milk, obtained at home by blending almonds with water and pressing through gauze. In the case of almond milk obtained in this manner at home almond milk contains only valuable substances from almonds and it is clear without unnecessary pulp or particles. Although the drawback is that the milk is not fully squeezed out of the pulp and this constitutes for a waste of the expensive and valuable base product and in result in a lesser amount of almond milk itself.

The aim of the invention is to develop a plant-based milk maker and blender, a small kitchen appliance that is a milk making appliance that serves mainly as a traditional blender but in addition to blending smoothies it allows on production of the plant-based milk on the spot. And purposefully for almond milk production which is freshly made and free from any particles. As indicated such a device has to have the ability to serve other utility functions such as of being a blender or juice extractor thanks to that the number of kitchen appliances will be reduced. The product obtained will be able to be used both at home and in gastronomy, as it will meet the sanitary requirements set for mass catering facilities.

Plant-based milk maker and blender is created for the ability of producing the plant-based milk, especially for the household use. According to this invention it consists of two segments, connected in a permanent separable manner. The lower segment constitutes the base with the drive engine and the upper segment constitutes the pitcher container with a lid and the blending element with the blending knives driven by the base engine.

The base has a cylindrical coupling element in the upper part that is provided with incisions corresponding with the incisions that are situated on the outside of the rotating part of the pitcher container equipped with blending knives. The blending element is coupled with the drive shaft of the base engine. The base engine works on two different rotational speeds, one slower and one faster. On the upper surface of the lid there is a lid cylinder with an inner hole. The inner diameter of the cylinder hole is analogous to the outer diameter of the drive shaft of the base engine. The pitcher container has a rotatable lid with a rotation lock with at least one slit at the periphery of the lid flange and at least one slit on the circumference of the pitcher container. The pitcher container has a conical shape, tapering downwards. On the upper surface of the pitcher container's base there is a removable draining spout attached that allows the outflow of the centrifuged milk to the outer perimeter of the pitcher. The base is equipped with at least one switch button that goes up and down for slower or faster rotation of the engine based of the mode the machine is on. We have blending fast speed rotation and also slow speed rotation that utilizes the centrifuged force for separation of the pulp and draining. The base can be also equipped with two push-buttons for the purpose of switching between modes.

In addition, inside the upper part of the base there is the first control sensor that after the pitcher container is placed on the base it activates the faster speed rotation of the blending mode. The second control sensor is located on the inner surface of the draining spout that it is activated after the bell-shaped cover is placed over the pitcher container that in turn is placed in upside down position on the base for the purpose of milk draining and pulp separation. That second control sensor activates the centrifugation mode with slower speed rotation that time, and it closes the electrical circuit.

The principle of operation of the milk maker and blender will be presented on the example of almonds, however, in the case of other plant-based material like grains and seeds it has the same functionality.

The pitcher container is mounted on the base of the machine, with the attached draining spout that is removable, and the pitcher container is coupled to the base engine's drive shaft. We are adding almonds to the pitcher container that are preferably pre-soaked and also the water in the proportion of 1:3 glasses of almonds to water.

The pitcher container is being closed with a lid that is being blocked to the closed lid position and that we accomplish by turning it slightly to the right after closing. The pitcher container with a smaller diameter at the bottom presses on a control sensor located in the base and alerts the machine's engine that is now set in the fast speed blending mode. The user activates a push-button or the switch button to start the machine and blending process. The base engine, thanks to the information provided by the first control sensor, works on blending high speed rotation. The necessary blending time is assessed visually until the liquid in the pitcher container is blended thoroughly and turns into white color and milky consistence, this takes about 30 seconds. During blending, the almonds are crushed by the blending knives of the blending element. The rotating blading knives set the content of the pitcher into a whirling motion, thanks to which the crushed almonds are thoroughly assimilated by water and milk is created together with the pulp. Then the engine of the milk maker and blender was switched off. The container is removed from the base, and the lid rotated slightly to the left to open small slits that would allow the milk to flow to the draining spout during the centrifugation mode in order to separate pulp and draining. The pitcher container prepared in this way is placed swiftly on the base's drive shaft by the manner of turning the pitcher upside down with both hands. The pitcher container attaches to the base's drive shaft via cylinder lid that has internal opening that matches the drive shaft opening. That moment the coupling of the pitcher container with the engine takes place. The whole machine is secured by placing a protective bell-shaped cover over the whole pitcher container and this prevents any milk drops from splashing during the process of clear milk separation from the pulp via the manner of centrifugal force. The protective bell-shaped cover presses the second control sensor located on the draining spout and the engine acquires information that the pitcher container is in a different position that signals centrifugal mode. Then the push button or the switch button is activated. The engine in this mode is used for separation of clear milk from pulp via centrifugal force and runs on lower speed rotation than during blending. The centrifugal force obtained by the rotational movement of the pitcher container spreads out the almond solids and almond milk on the inside walls of the pitcher container. The solid parts dry out thoroughly from that centrifugal rotational speed and adhere equally to the walls of the pitcher container within seconds and the almond milk drips down the pitcher container inside walls thanks to the gravity. Almond milk pushes into the open slits on the edge of lid and the pitcher and it flows into the outside draining spout placed on the outer perimeter. From there with the use of draining funnel milk flows into the glass or other portable container and we have the almond milk ready.

Almond milk obtained in that manner is reach in valuable ingredients and at the same time it has a uniform consistency, free of solid particles.

This device can also act as a sole blender. That time one does not need to mount the draining spout and/turn the pitcher container upside down for any reason. The pitcher container is filled with fruit and yogurt and those ingredients get blended together and the fruit smoothie is obtained.

The subject of the invention is also the milk maker and blender that serves as kitchen appliance and it does not require turning the container upside down at all. It consists of three segments connected in a permanent separable manner. The lower segment is the base with the drive engine and the upper segment is the container with the lid and the blending element coupled with the rotary knives driven by the base engine. Between the upper and lower segments there is additionally the central segment, driven by the base engine also.

The base has a coupling element equipped with the incisions corresponding to the incisions in the rotating blending element of the container. The blending element of the container is coupled to the drive shaft of the base engine. The container has a lid and at least one closing hole in its bottom. Under the bottom of the container there is a sliding pad with at least one opening corresponding to the closing hole. The sliding pad has a protrusion sticking out beyond the outline of the container used to slide it in a horizontal plane. The base can be equipped with two switch buttons. The central segment consists of a cylindrical chamber with a drain opening and a draining funnel on its circumference. In the cylindrical chamber there is a rotatable perforated drum. The drive shaft of the base engine passes through the central part of the drum. The drive shaft also drives the blending element in the container located above the drum and cylindrical chamber of the central segment.

The principle of operation of the device will be presented on the example of almonds, however in the case of the other plant-based milk material it works the same.

The container is placed on the central segment, that in turn is placed on the base. Almonds are inserted, preferably pre-soaked, and then the water is poured into the container. The amount of water to almonds that is recommended it is in the proportion of 3:1 glass. The container is closed with the lid and one turns on the base engine. The base engine drives the drive shaft with which the container's blending element is coupled, and it also drives the rotating perforated drum in the central segment. The user activates a push-button or switch button. The necessary blending time is assessed visually until the liquid in the container gains a white color. During blending the almonds are crushed by the blending knives of the blending element. The rotating blending knives set the content of the container into a whirling motion, thanks to which the substances comprised in the crushed almonds are mixed thoroughly and dissolved with the water. Then the sliding pad is being slid manually and it opens up the opening hole in the bottom of the container through which the flow of the content goes from the container to the central segment that constitutes for cylindrical chamber and perforated drum. The centrifugal force activated due to the rotary motion of the perforated drum separates immediately the solids of almonds from the almond milk that through the perforations of the drum penetrates directly into the cylindrical chamber in the central segment. Almond milk from there flows to the glass through the draining funnel attached to the outside of the cylindrical chamber.

Almond milk obtained in that manner is reach in valuable ingredients and at the same time it has a uniform consistency, free of solid particles.

The device can also act concurrently as a blender. The container is filled out with fruit and yogurt, set on the blending mode and the smoothie or fruit shake is being created. Furthermore, this device can also serve the third function of a typical juice extractor. In this option no container is mounted on the central segment, but one closes the cylindrical chamber with the lid that is equipped underneath with flat metal shield with many small and sharpened holes on its upward surface. The shield is analogous to that one used in juice extractors. The lid on the top has a bigger hole with an upward fence and it also has an accessory in form of pushing piston similar to one used in a typical juicer.

The device according to the invention in both variants allows to obtain plant-based milk at the home as well as at the cafes and catering outlets in a convenient and hygienic way. The device is multifunctional, aside from being a plant-based milk maker in parallel it acts as a blender or blender with the juice extractor function.

BRIEF DESCRIPTION OF THE DRAWINGS

The subject of the invention was illustrated with the technical drawings.

DETAILED DESCRIPTION

Examples 1

Figure 1:
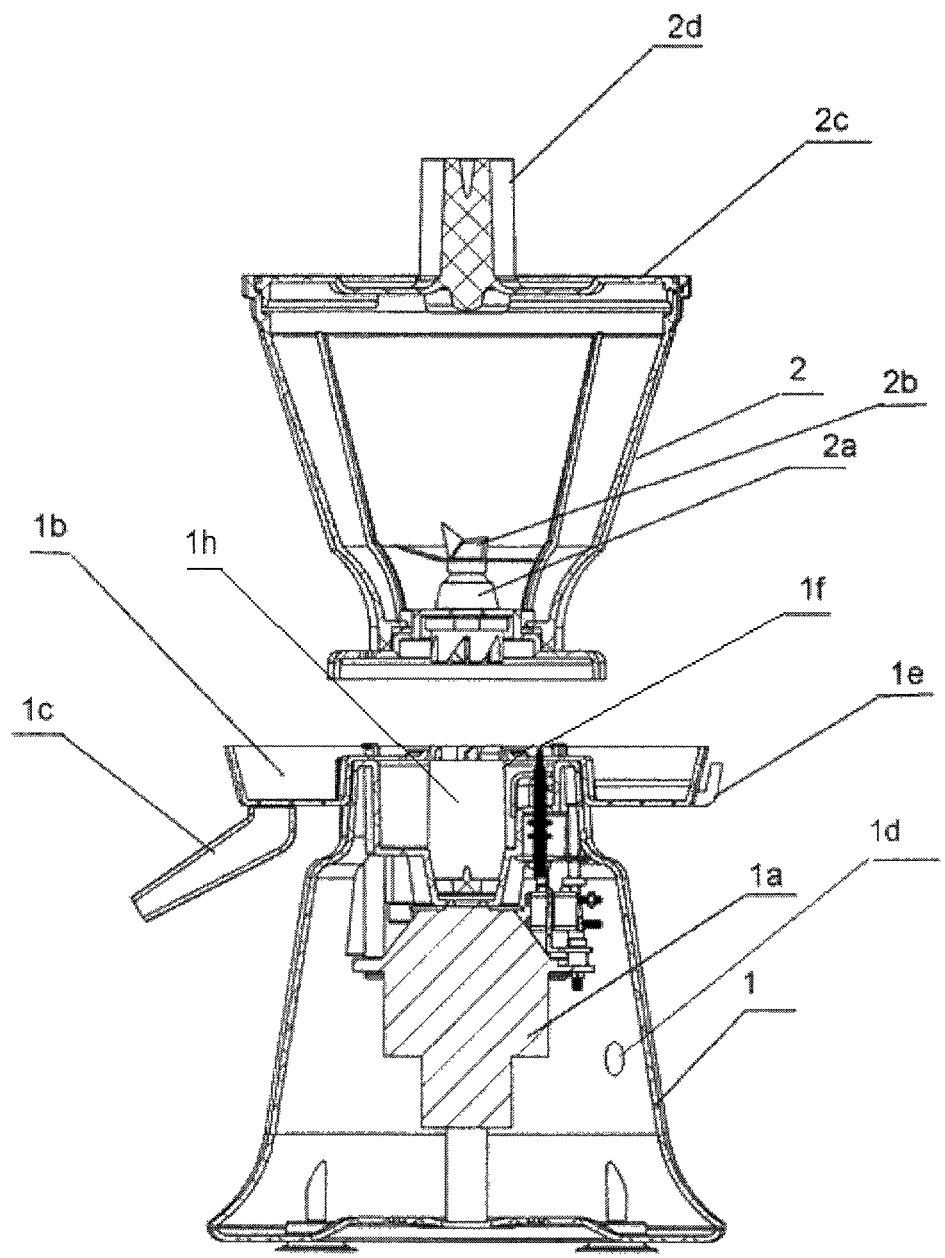
FIG. 1 shows the first model of the plant-based milk maker and blender in the blending mode.
Figure 2:
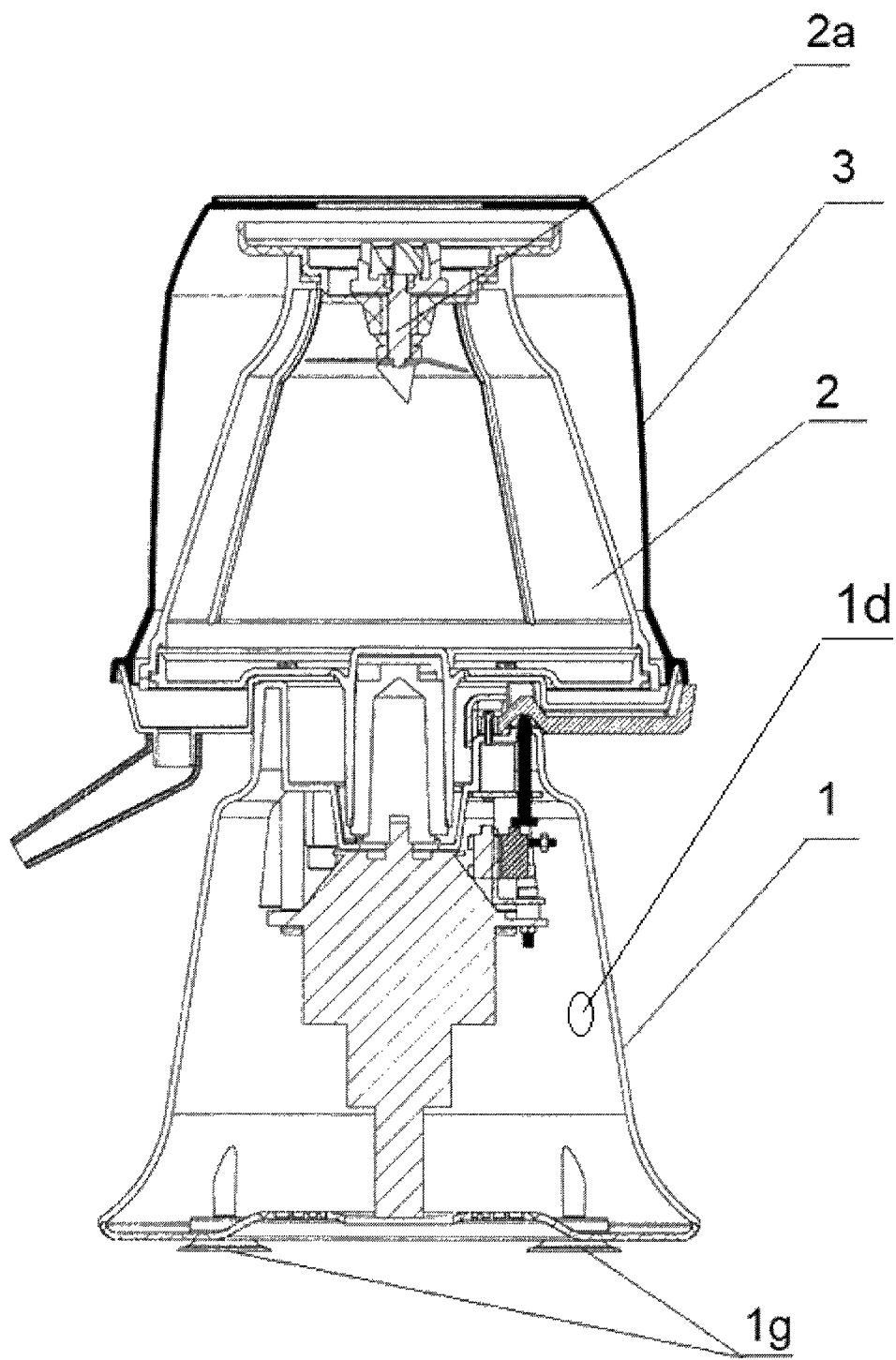
FIG. 2 shows the first model of the plant-based milk maker and blender in cross-section view in the draining mode with the use of centrifugal force.
Figure 3:
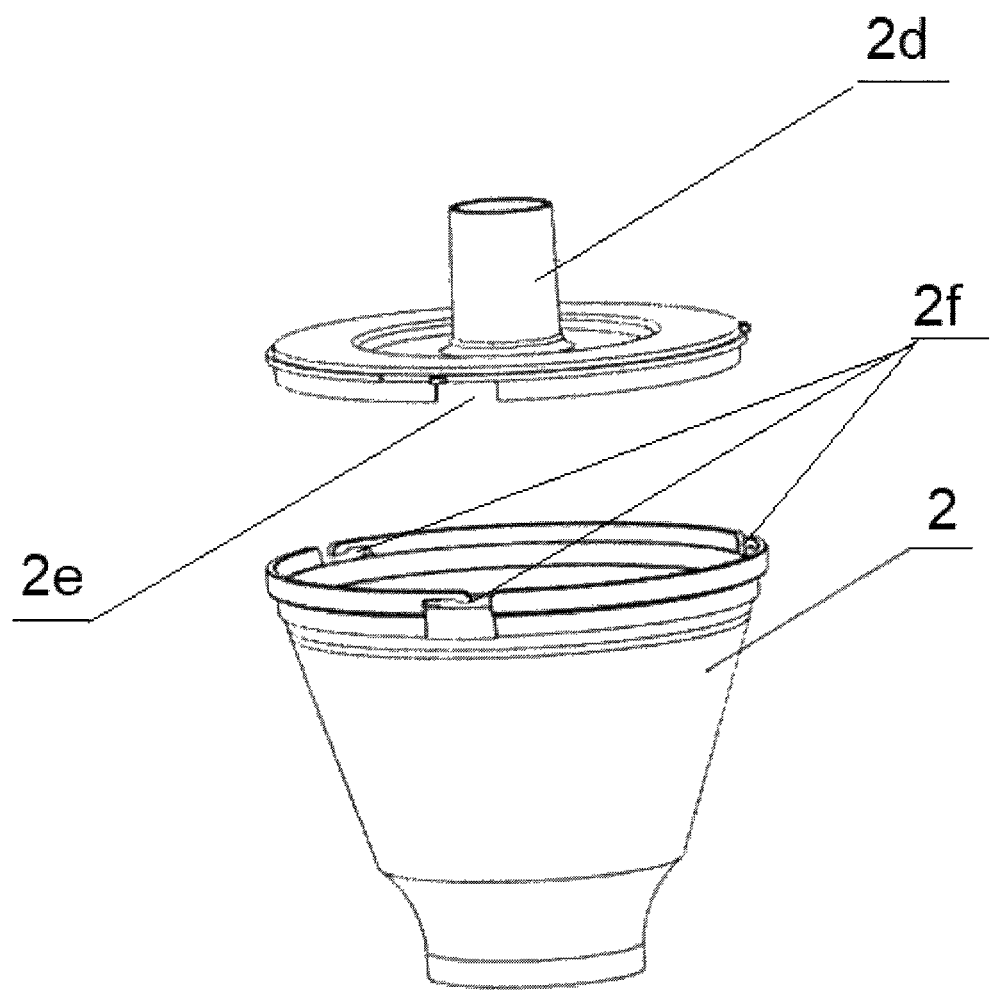
FIG. 3 shows the pitcher container of the first model in the perspective view.
Figure 4:
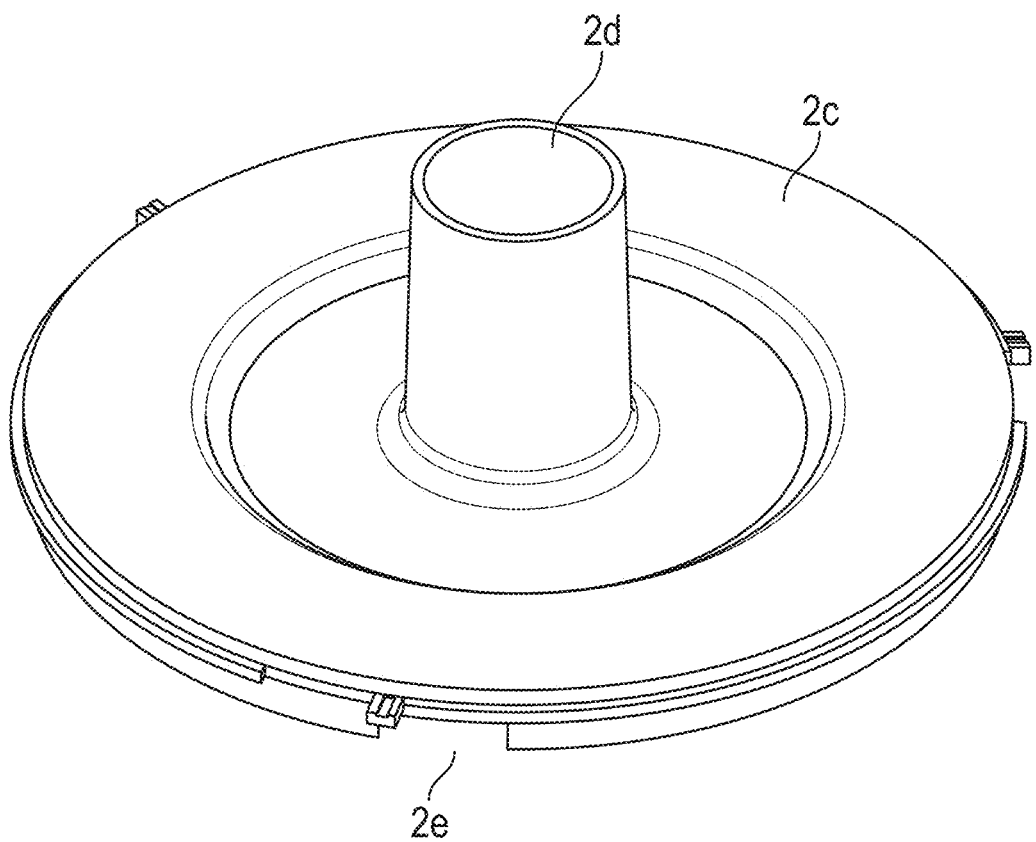
FIG. 4 shows the blender's lid with lid cylinder of the first model of the milk maker and blender as a cross-section in the perspective view.
Figure 5:
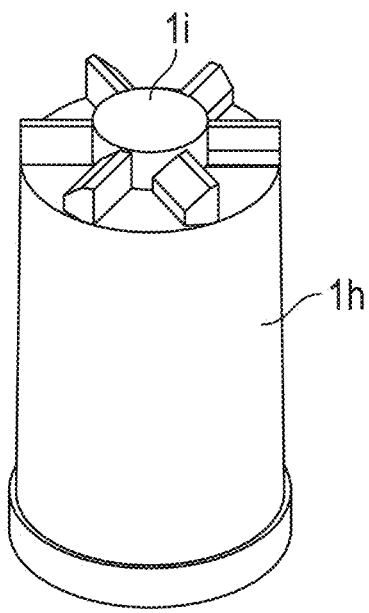
FIG. 5 shows the milk maker and blender's coupling element of the first model in the perspective view.
Figure 6:
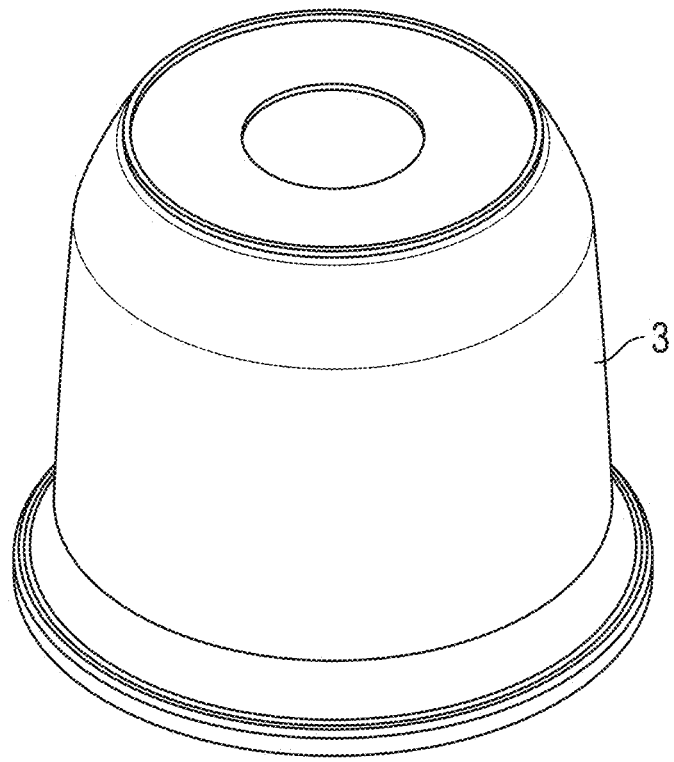
FIG. 6 shows the milk maker and blender's bell-shaped cover of the first model in a perspective view.
Figure 7:
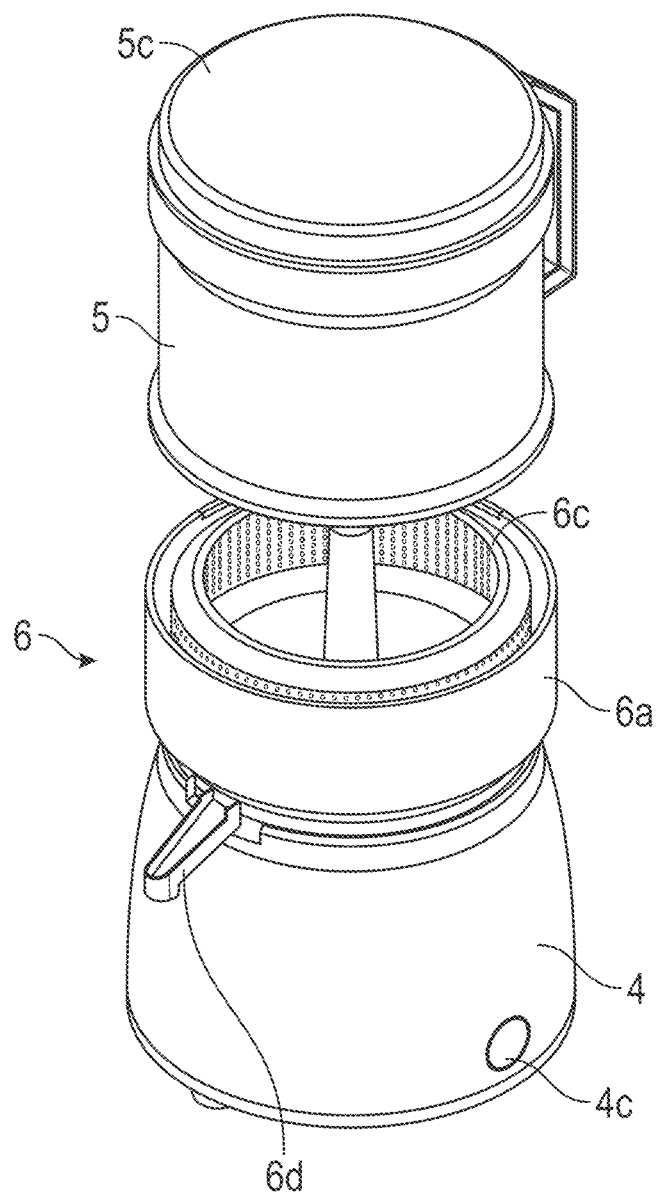
FIG. 7 shows the second model of the milk maker and blender in a perspective view.
Figure 8:
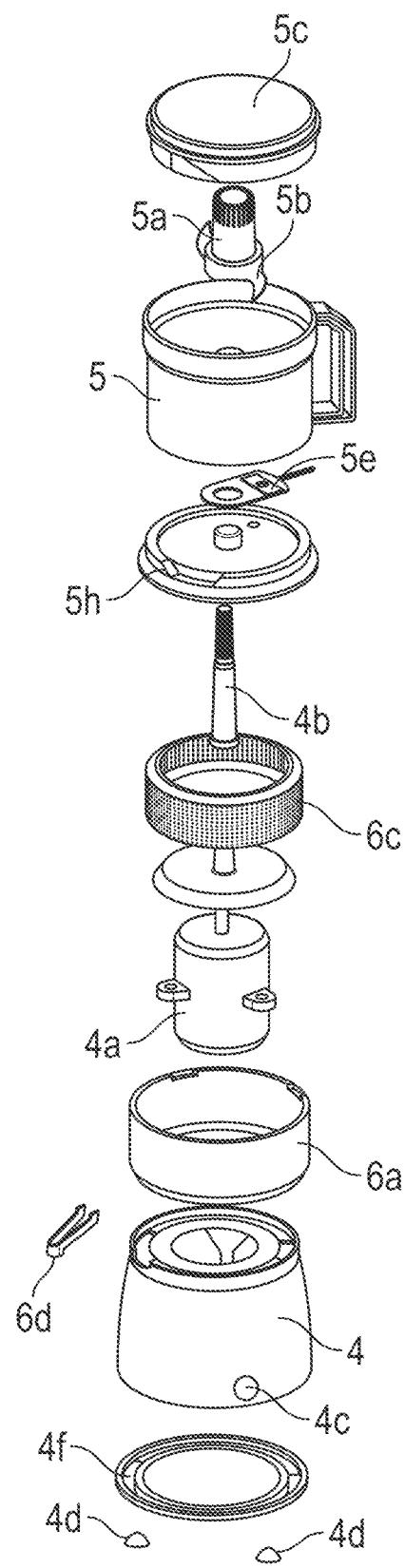
FIG. 8 shows the second model of the milk maker and blender in the exploded view.
Figure 9:
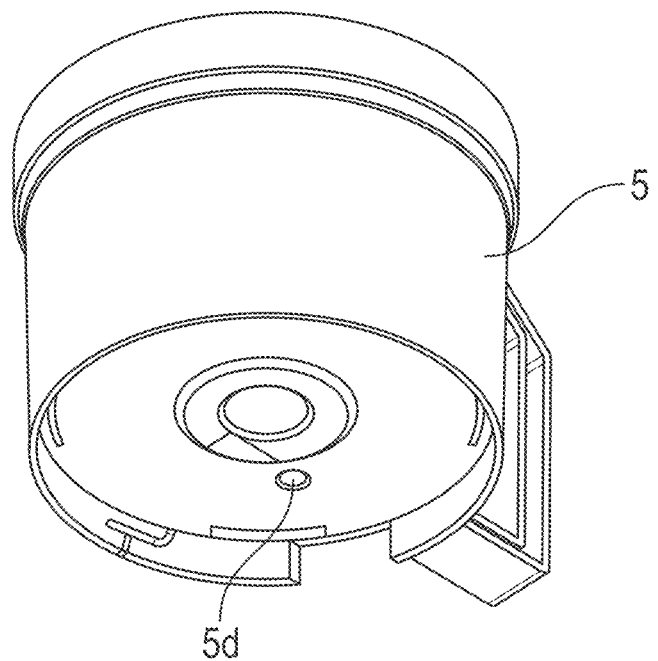
FIG. 9 shows the milk maker and blender's container of the second model in a perspective view from below.
Figure 10:
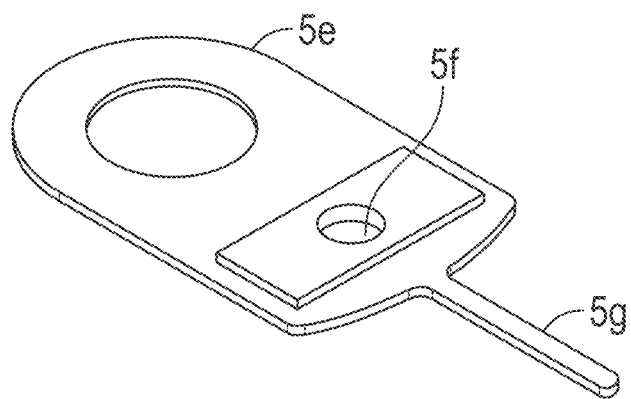
FIG. 10 shows the sliding pad of the second milk maker and blender model in the perspective view.
Figure 11:
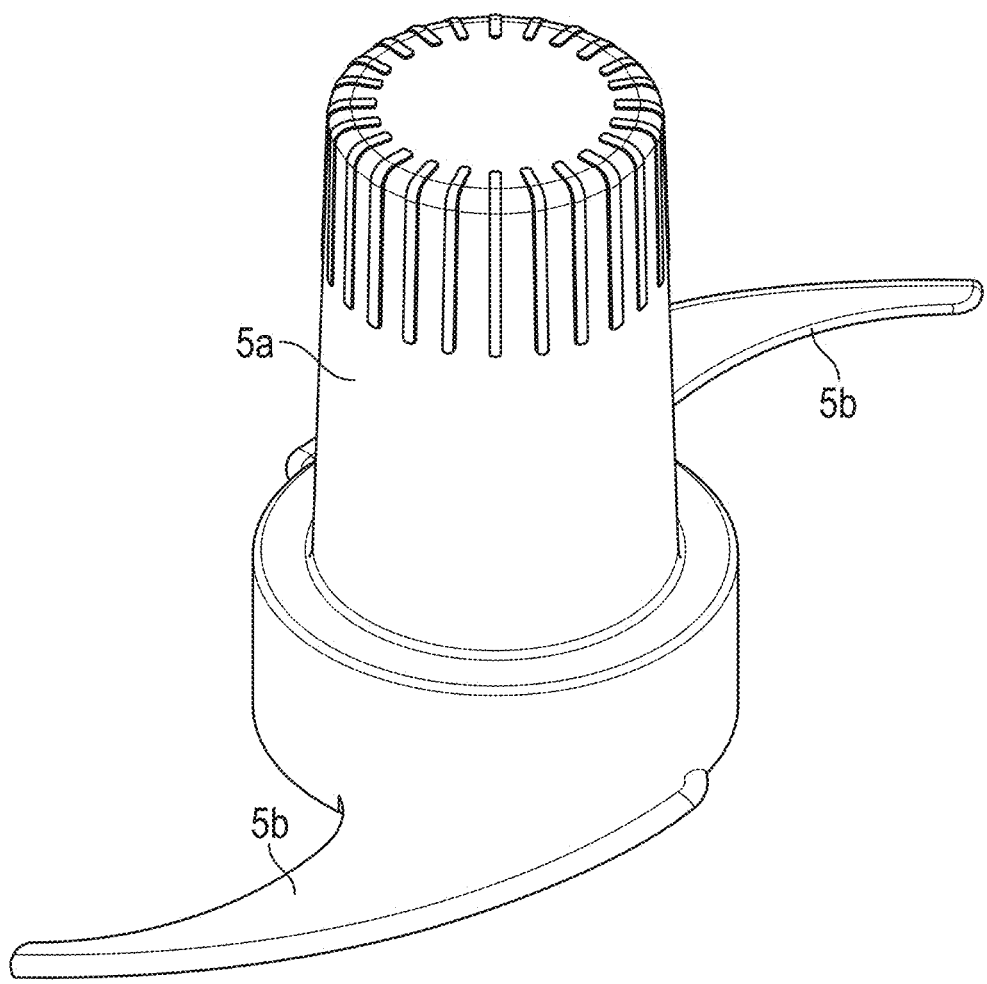
FIG. 11 shows the blending element with the blending knives of the second model in a perspective view.
Figure 12:
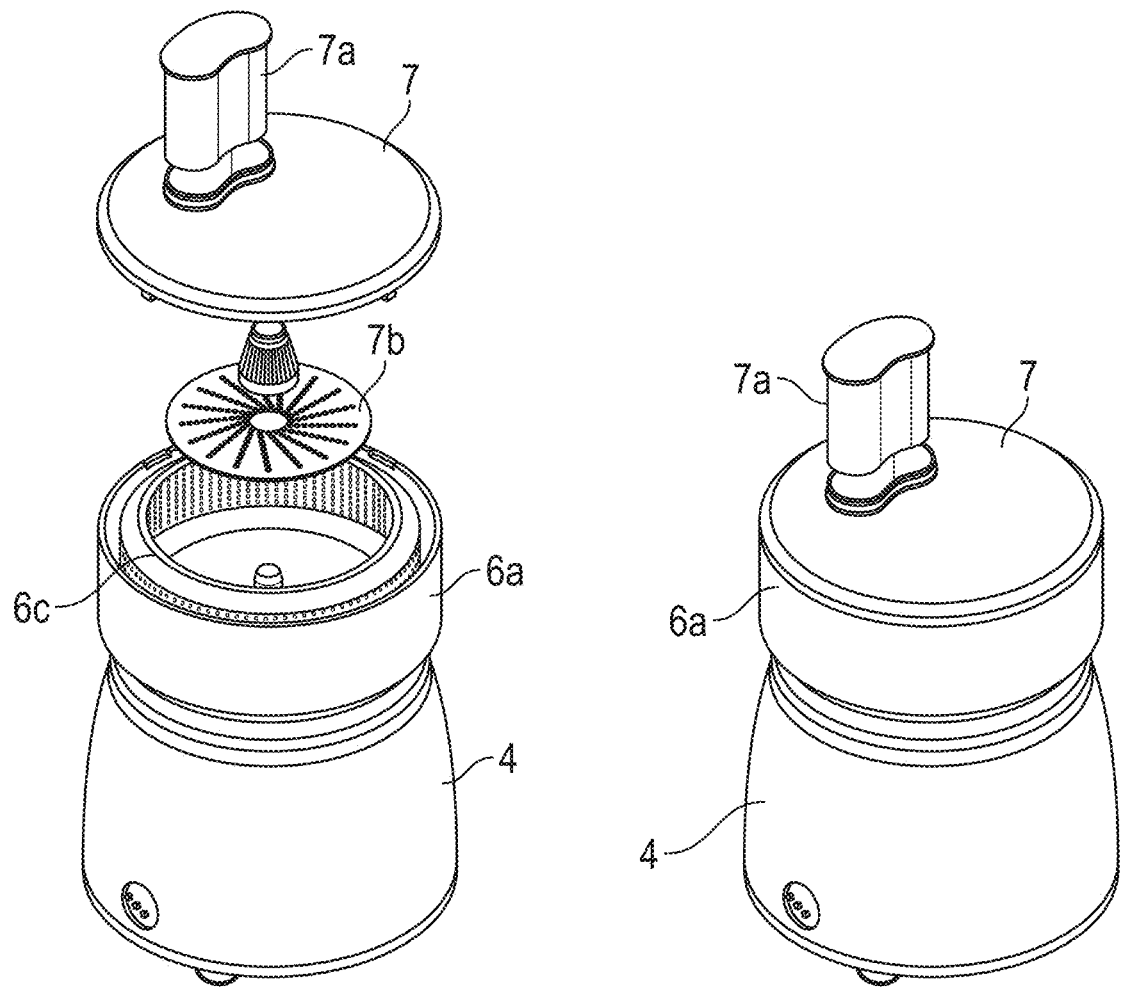
FIG. 12 shows the milk maker and blender of the second model in a juice extractor function in the perspective and exploded view.

Plant-based milk maker and blender for producing plant-based milk consists of two segments, connected in a permanent separable manner. The bottom segment constitutes for the base (1) with the drive engine (1*a*) and the upper segment is the pitcher container (2) with the rotatable lid (2*c*) and the blending element (2*a*) equipped with the blending knives (2*b*) driven by the drive engine (1*a*) of the base (1). The base (1) has the cylindrical coupling element (1*h*) in the upper part, that is equipped with the incisions (1*i*) corresponding to the incisions in the rotating blending part (2*a*) coupled with the blending knives (2*b*) of the pitcher container (2). The base is also provided with the supporting sockets (1*g*). The rotating blending part (2*a*) is coupled to the drive shaft of the drive engine (1*a*) of the base (1). The drive engine (1) operates on two different speeds. On the upper surface of the lid (2*c*) there is the lid cylinder (2*d*) with an inner hole with a diameter analogous to the outer diameter of the drive engine (1*a*) of the base (1). The pitcher container (2) has the rotatable lid (2*c*) with a rotation lock with three slits (2*e*) on the circumference of the lid (2*c*) and three slits (2*f*) on the circumference of the pitcher container (2). The pitcher container (2) has a conical shape tapering downwards. On the upper surface of the base (1) there is a removable draining spout (1*b*) with the draining funnel (1*c*) for the outflowing milk that flows to the outer circumference. The base (1) is equipped with one switch button (1*d*). Inside the upper part of base (1) there is the first control sensor (1*f*). On the inner surface of the draining spout (1*b*) there is the second control sensor (1*e*). Furthermore, the device is provided with the protective bell-shaped cover (3).

250 g almonds were soaked and left overnight. The device was assembled by placing the pitcher container (2) on the base (1) with the narrower part going downwards. The pitcher container (2) pushed on the control sensor (1*f*). Into the pitcher container (2), soaked almonds were added and covered with three glasses of boiled cooled water. The rotatable lid (2*c*) was closed by rotating it in such a way that the slits (2*e*) on the lid and the slits (2*f*) on the circumference of the pitcher container closed off. The drive engine (1*a*) of the base (1) was started by pressing the switch button (1*d*). The pressure of the pitcher container (2) on the first control sensor (1*f*) caused the drive engine (1*a*) to run at a higher speed rotation. There was a change in the liquid color in the pitcher container (2). When the liquid color became white and ceased to be transparent, the drive engine (1*a*) of the base (1) was turned off. The pitcher container (2) was removed from the base (1), the slits (2*e*) on the lid and the slits (2*f*) on the circumference of the pitcher container were opened by the rotation of the lid (2*c*) of the pitcher container (2). The pitcher container was placed upside down by mounting the lid cylinder (2*d*) on the drive shaft of the drive engine (1*a*) of the base (1). A protective bell-shaped cover (3) was placed over, so that it pressed the second control sensor (1*e*). The drive engine (1*a*) was started and worked at lower rotation speed than during blending. The pitcher container (2) that was mounted on the drive shaft was rotating now with slower speed and the centrifugal force caused the remaining particles from the almond blending adhere tightly to the inner walls of the pitcher container (2) and the almond milk flew through open slits (2*e*) and (2*f*) into the draining spout (1*b*) and from there straight into the draining funnel (1*c*) and then the jug. After completing the separation of almond milk from the almond residue solids, the engine drive (1a) was turned off, the kitchen appliance was disassembled and washed. The almond milk obtained was clear and contained no solids.

The device can be used as a blender for making fruit shakes and other smoothies from blended fruit and vegetables. After obtaining the smoothie, the pitcher container does need to be turn upside down.

Example 2

Plant-based milk maker and blender for making plant-based milk consists of three segments, connected in a permanent separable manner. The lower segment is the base (4) with the drive engine (4a) sitting on the base (4f) that is supported with the supporting sockets (4d). The upper segment is the container (5) with a lid (5c) and a blending element (5a) combined with the rotary knives (5b), driven by a drive engine (4a) of the base (4). Between the upper and lower segments there is a central segment (6) driven by the drive engine (4a) of base (4). The base (4) has a coupling element (4b) provided with the incisions corresponding with the incisions in the blending element (5a) of the container (5).

The blending element (5a) is coupled with the drive engine (4a) of the base (4). The container (5) has a lid (5c) and one lockable opening (5d) in the bottom of the container, under the which there is a sliding pad (5e) also with one opening (5f). The sliding pad (5e) has a projection (5g) extending beyond an outline (5h) of the container (5). The base (4) is provided with one switch button (4c). The central section (6) is made of a cylindrical chamber (6a) with a drain opening and a draining funnel (6d) on its circumference. In the cylindrical chamber (6a) there is a rotary perforated drum (6c). The drive engine (4a) of the base (4) passes through the central part of the drum (6c).

250 g almonds were soaked and left overnight. The device was assembled by placing the container (5) on the base (4) and the central segment (6) was placed between them. In the container (5), the soaked almonds were placed, and three glasses of boiled cooled water were added. The lid (5c) was closed and the drive engine (4a) of the base (4) was turned on.

The change of color of the liquid in the container (5) was observed. When the color of the liquid became white and the liquid was no longer transparent, the sliding pad (5e) with one opening (5f) has been slid sideways to uncover the opening in the bottom of the container by holding and pushing on one side of pad's projection (5g) with the finger. The milk liquid was poured into the rotating central segment (6) where the centrifugal force caused it to push through the rotary perforated drum (6c) to the cylindrical chamber (6a) from where it went straight through the drain opening and the draining funnel (6d) into the standing jug. After completion of the almond milk separation from solids particles of almonds, the drive engine (4a) was turned off, the appliance was disassembled and washed. The almond milk obtained was clear and contained no solids.

This device can be also used as a blender. After completion of the blending, the sliding pad (5e) does not need to be slid to open the hole in the bottom of the container. The obtained fruit smoothie is poured into another dish.

The device can be used further as a juice extractor too. The central segment does not get the container (5) put on top of it but instead the grinding metal shield (7b) is placed on top of the central segment and covered with the lid (7) with the piston (7a). Activation of drive engine (4a) with the switch button puts the grinding metal shield (7b) into the lower speed rotation. The fruit or vegetable is put into the central segment through the lid and pushed in with the piston (7a) into the cylindrical chamber (6a) with the perforated drum (6c). The fruit is crushed, and juice gets whirled due to the centrifugal forced and it goes straight to the draining funnel (6d) and into the adjacent juice collecting vessel.

The invention claimed is:

1. A plant-based milk maker and blender for the production of plant-based milk, comprising:
    three segments, connected in a separable manner, wherein:
        a bottom segment comprises a base (4) with a drive engine (4a);
        an upper segment comprises a container (5) with a lid (5c) and a blending element (5a) including rotary knives (5b), powered by the drive engine (4a) of the base (4); and
        a central segment (6) between the upper and lower segments is driven by the drive engine (4a) of the base (4) which has a coupling element (4b) equipped with first incisions corresponding to second incisions in the blending element (5a) of the container (5), wherein the blending element (5a) is coupled with the drive engine (4a) of the base (4), and the container (5) has at least one lockable opening (5d) in a bottom of the container, under which there is a sliding pad (5e) with at least one opening (5f), and the sliding pad (5e) has a projection (5g) extending beyond an outline of the container (5), and the base (4) is provided with at least one switch button (4c), and the central segment (6) contains a cylindrical chamber (6a) with a drain opening and a draining funnel (6d) on a circumference of the cylindrical chamber (6a), and in the cylindrical chamber (6a) there is a rotatable perforated drum (6c), and a drive shaft of the drive engine (4a) of the base (4) passes through a central segment of the drum (6c);
    wherein the sliding pad (5e) is adapted to move between a locked position in which the at least one opening (5f) of the sliding pad is not aligned with the at least one lockable opening (5d) of the container, and an unlocked position in which the at least one opening (5f) of the sliding pad is aligned with the at least one opening (5d) of the container.

2. The plant-based milk maker and blender according to claim 1, wherein the at least one switch button (4c) comprises two switch buttons (4c).

* * * * *